United States Patent [19]

Pitt et al.

[11] Patent Number: 4,519,259
[45] Date of Patent: May 28, 1985

[54] VORTEX SHEDDING FLUID FLOWMETER

[75] Inventors: Gillies D. Pitt, Saffron Walden; Roger J. Williamson, Harlow; David N. Batchelder, London, all of England; Arulanandam M. Prabakaran, Ayanavaram Madras, India

[73] Assignee: International Telephone & Telegraph Corp., New York, N.Y.

[21] Appl. No.: 470,662

[22] Filed: Feb. 28, 1983

[30] Foreign Application Priority Data

Mar. 2, 1982 [GB] United Kingdom ............... 8206032

[51] Int. Cl.³ .............................................. G01F 1/32
[52] U.S. Cl. .................................................. 73/861.22
[58] Field of Search ........................ 73/861.22, 861.23

[56] References Cited

U.S. PATENT DOCUMENTS

| | | | |
|---|---|---|---|
| 2,813,424 | 11/1957 | Liepmann et al. | 73/861.24 X |
| 3,680,375 | 8/1972 | Joy et al. | 73/861.23 |
| 3,818,877 | 6/1974 | Barrera et al. | 73/861.23 X |
| 4,318,303 | 3/1982 | Harrington | 73/861.23 |
| 4,339,661 | 7/1982 | Pitt et al. | 73/861.22 |
| 4,375,768 | 3/1983 | Beck et al. | 73/861.23 |
| 4,418,579 | 12/1983 | Harrington | 73/861.23 |

FOREIGN PATENT DOCUMENTS 2084720 4/1982 United Kingdom ............ 73/861.22

Primary Examiner—Charles A. Ruehl
Assistant Examiner—Brian Tumm
Attorney, Agent, or Firm—T. L. Peterson; E. C. Jason

[57] ABSTRACT

In order to determine the vortex shedding frequency, from which the fluid flow rate may be calculated, an optical beam, such as produced by a laser, is passed through a fluid, transversely to a vortex street therein, and modulated in dependence on the alternate high and low velocity regions comprising the vortex street. The modulated signal is detected and "cleaned" of noise by filtering with a first (high) band-pass filter of a center frequency $f_c$, such that the first filter output comprises an amplitude modulated signal of carrier frequency $f_c$ modulated by the vortex shedding frequency, that is the frequency of oscillation of the power spectra between the respective curves for the high and low velocity regions. The first filter output is demodulated and filtered by a second (low) band-pass filter, whose output is of a frequency comprising the vortex shedding frequency.

8 Claims, 10 Drawing Figures

VORTEX SHEDDING FLUID FLOWMETER

This invention relates to fluid flowmeters and in particular to flowmeters to the vortex shedding type, and methods and apparatus for use in monitoring the vortex shedding frequency.

Vortex shedding is a phenomenon which occurs when a fluid flows past a bluff (non-streamlined) body. Boundary layers of slow moving viscous fluid are formed along the outer surface of the body and, because it is not streamlined and the fluid flow cannot follow the contours of the body, become detached and roll up into vortices. When a bluff body is placed in a uniform stream of fluid two separate shear layer are formed, one on each side of the body, the vorticity of the two layers being opposite. A mutual interaction occurs between the two layers and, in the absence of disturbing influences, a stable pattern of alternating (i.e. of the opposite rotational sense) vortices is formed downstream of the body. This phenomenon is well known in the art and is commonly called a vortex street. In a truly uniform flow around certain bluff shapes this vortex shedding shows a periodicity that is, as far as can be measured, purely monotonic, the frequency being linearly related to the fluid velocity.

Various flowmeters employing this principle have been described and typically they comprise a bluff body disposed in a fluid stream and means arranged downstream of the body for detecting the vortices produced by the interaction of the fluid with the body.

According to one aspect of the present invention there is provided a method of monitoring the vortex shedding frequency from which a fluid flow rate or a parameter dependent thereon may be calculated, comprising modulating an optical beam in dependence on the alternate high and low velocity regions comprising the vortex street, detecting the modulated beam, filtering the detector output by means of a first band-pass filter of a center frequency $f_c$, the first filter output comprising an amplitude modulated signal of carrier frequency $f_c$ modulated by the vortex shedding frequency, demodulating the first filter output and filtering the demodulated output by means of a second band-pass filter, the frequency of the second filter output comprising the vortex shedding frequency.

According to another aspect of the present invention there is provided an apparatus for monitoring a vortex shedding frequency including means for modulating an optical beam in dependence on the alternate high and low velocity regions comprising the vortex street, means for detecting the modulated beam, a first band-pass filter of a center frequency $f_c$ for filtering the detector output, the first filter output comprising an amplitude modulated signal of carrier frequency $f_c$ modulated by the vortex shedding frequency; means for demodulating the first filter output, and a second band-pass filter for filtering the demodulating means output, the frequency of the second filter output comprising the vortex shedding frequency.

Embodiments of the present invention will now be described with reference to the accompanying drawings, in which.

There are various known methods for detecting the presence of vortices produced by bluff bodies. The present invention employs optical techniques, for example, light scattered, deflected or diffracted from particles carried along with fluid flow, small eddies within the vortices, or other refractive index variations of the fluid due to the passage of the vortices. Thus a light beam directed through the fluid and transversely to the fluid flow from a source to a detector downstream of the bluff body is variably modulated, and a power spectrum may be obtained by applying the detector output signal to a wave analyser. The principles of such optical techniques employing scattering from particles etc. are described more fully in our published U.K. Application No. 2,116,700, filed Mar. 2, 1982, published Sept. 28, 1983 (G. D. Pitt—R. J. Williamson—D. N. Batchelder—A. M. Prabakaran).

Figure 1A:
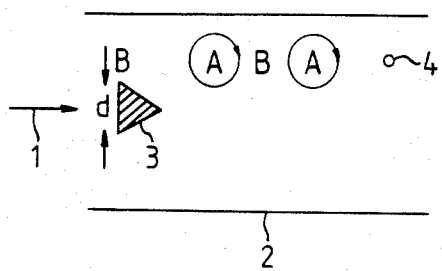
FIGS. 1a and 1b show, respectively and schematically, a side view and a plan view of a vortex producing and detecting arrangement.
Figure 1B:
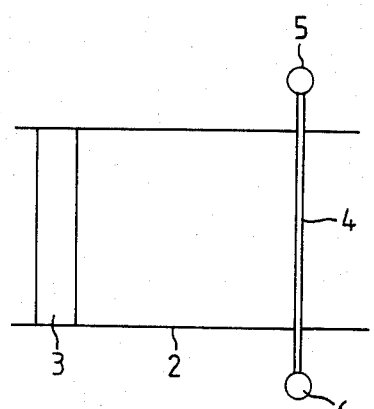
Figure 2:
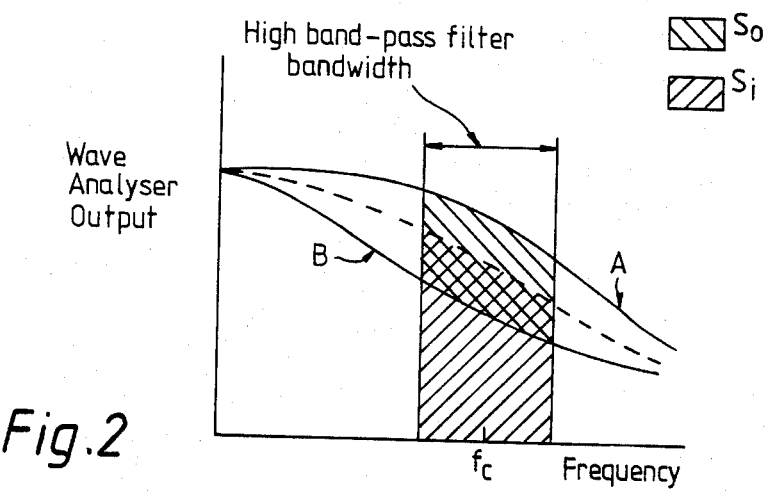
FIG. 2 shows the power spectra for the arrangement of FIGS. 1a and 1b.

FIGS. 1a and 1b show, respectively, a side view and a plan view of an opto-electronic arrangement for detecting vortices produced by a bluff body. A fluid is directed, in the direction of arrow 1, through a duct 2. A bluff body 3 produces a vortex street marked by high and low velocity regions, moving in the direction of arrow 1, denoted by A and B. A light beam 4 is directed across the duct 2 between a source 5 and a detector 6. The source may comprise a Spectra Physics He-Ne laser with a beam diameter of approximately 0.9 mm, whilst the detector may comprise a silicon PIN photodiode. The light beam may, alternatively, be provided by another suitably focussed light source. Whereas the source/detector of FIGS. 1a and b is shown spaced apart from the bluff body, alternative arrangements, such as with an "in-body" detector and involving the use of first and second bluff bodies as described for example in our co-pending application now U.S. Pat. No. 4,485,679, filed Dec. 2, 1982 (G. D. Pitt—R. J. Williamson—D. N. Batchelder—A. M. Prabakaran) may be employed. A power spectrum may be obtained by applying the detector output to a wave analyzer. The power spectra as given by the detector output due to the passage of the vortices is shown in FIG. 2. The power spectrum oscillates between two curves A and B formed by the high and low velocity (pressure) values respectively. The frequency of oscillation between the curves A and B is the vortex frequency.

If the signals are filtered by a band-pass filter of center frequency $f_c$, a "high" band-pass filter, the output can be thought of as the amplitude modulated signal of carrier frequency $f_c$ modulated by the vortex frequency.

Figure 3:
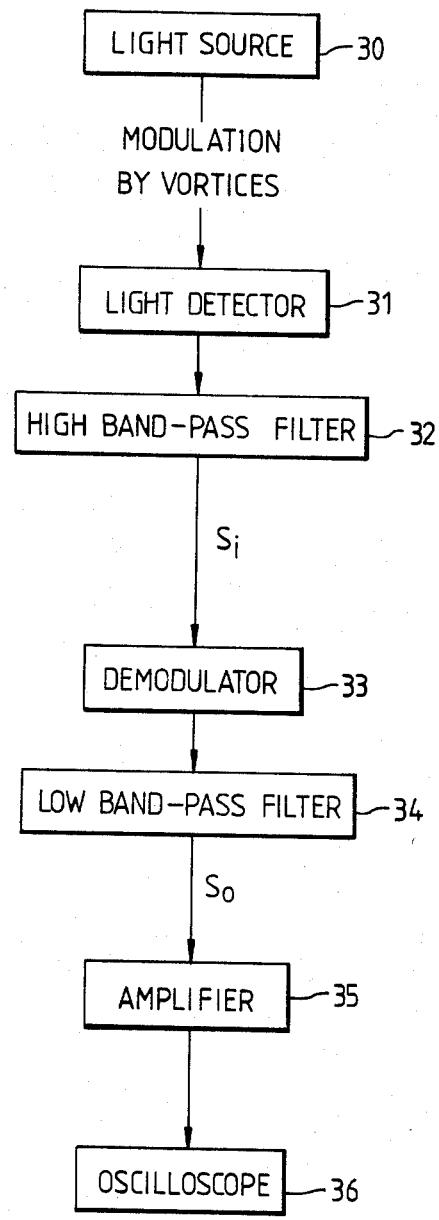
FIG. 3 shows a block diagram of the circuitry of a basic vortex flowmeter according to an embodiment of the present invention.

The vortex frequency may be obtained by passing this amplitude modulated signal through a demodulator and a "low" band-pass filter, as in any AM detector, the resultant waveform frequency being the vortex frequency. FIG. 3 shows the basic arrangement of detection system. The output of a light source 30 is modulated by vortices and detected by light detector 31, whose output is passed through a high band-pass filter 32 to produce an output $S_i$. The output filter 32 is demodulated at 33 and passed through a low band-pass filter 34, whose output $S_o$ is then amplified at 35 to produce an amplified low band-pass filter output which can be displayed on an oscilloscope 36 or another output display arrangement.

The vortex information in a number of fluids has been found to be carried over a wide range of frequencies such as from approximately 5 kHz to 60 kHz. Low frequency vibrations can be effectively eliminated by the "high" band-pass filter.

In order to make a comparative assessment of the vortices produced, it is necessary to define a "Vortex Quality Factor" (VQF) which is a ratio given by $VQF=S_o/S_i$. It was found that noise due to mechanical vibrations of the pump producing fluid flow, and the fluid flow itself, was confined to a low frequency band of 0–500 Hz and was thus effectively filtered by the high band-pass filter. This filtering is particularly advantageous since it also eliminates so-called low frequency spanner and knock noise. $S_o$ is equivalent to the area bounded by A and B (FIG. 2) and is a function of velocity, particle size and concentration (where appropriate) and detector output. The detector output is a function of the light intensity of the source, window fouling and any misalignment between the light detector and the light beam. It was in order to take care of these variations that the ratio $S_o/S_i$ was used for VQF. $S_i$ is equivalent to the total area bounded by the average of A and B. The ratio $S_o/S_i$ therefore is a function of the difference between the velocities in the regions A and B. Lower VQF meant greater difference in the velocities. Flow dynamic investigations using the optical techniques were used to locate the regions of largest velocity difference. Referring to FIG. 1a, the velocity of vortex A will increase as it moves away from the bluff body 3 and will reach its peak when the vortex is fully formed. The value of VQF was expected to be largest at this location. Larger VQF values were, however, accompanied by lower distortion of the vortex signal $S_o$. The tranditional location to detect vortices (pressure and velocity fluctuations) has been 2d to 3d downstream of the bluff body and 1.5d away from the wake axis. Experiments with the opto-electronic sensor arrangement of the present invention to detect vortices generated by conventional bluff bodies and with varying flow rates, shows that the location varied as a function of flow rate and that a more static sensing region, such as provided by the "in-body" detector is preferable. The use of such an opto-electronic sensor with a very small sampling volume, the beam having a very small cross-section, means that the detection of vortex formation with different bluff body shapes can be studied in much greater detail than hitherto.

Figure 5:
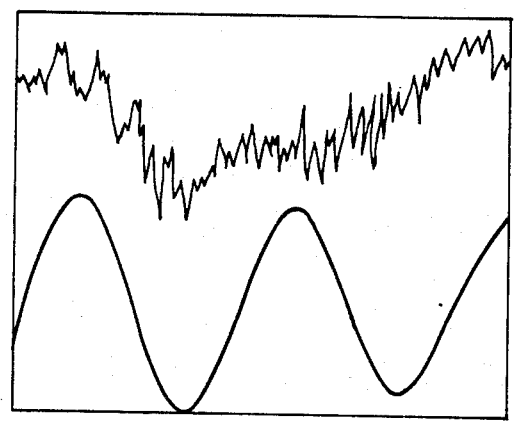
FIG. 5 shows a plot of detector output before and after filtering, demodulating and further filtering according to the present invention.
Figure 4:
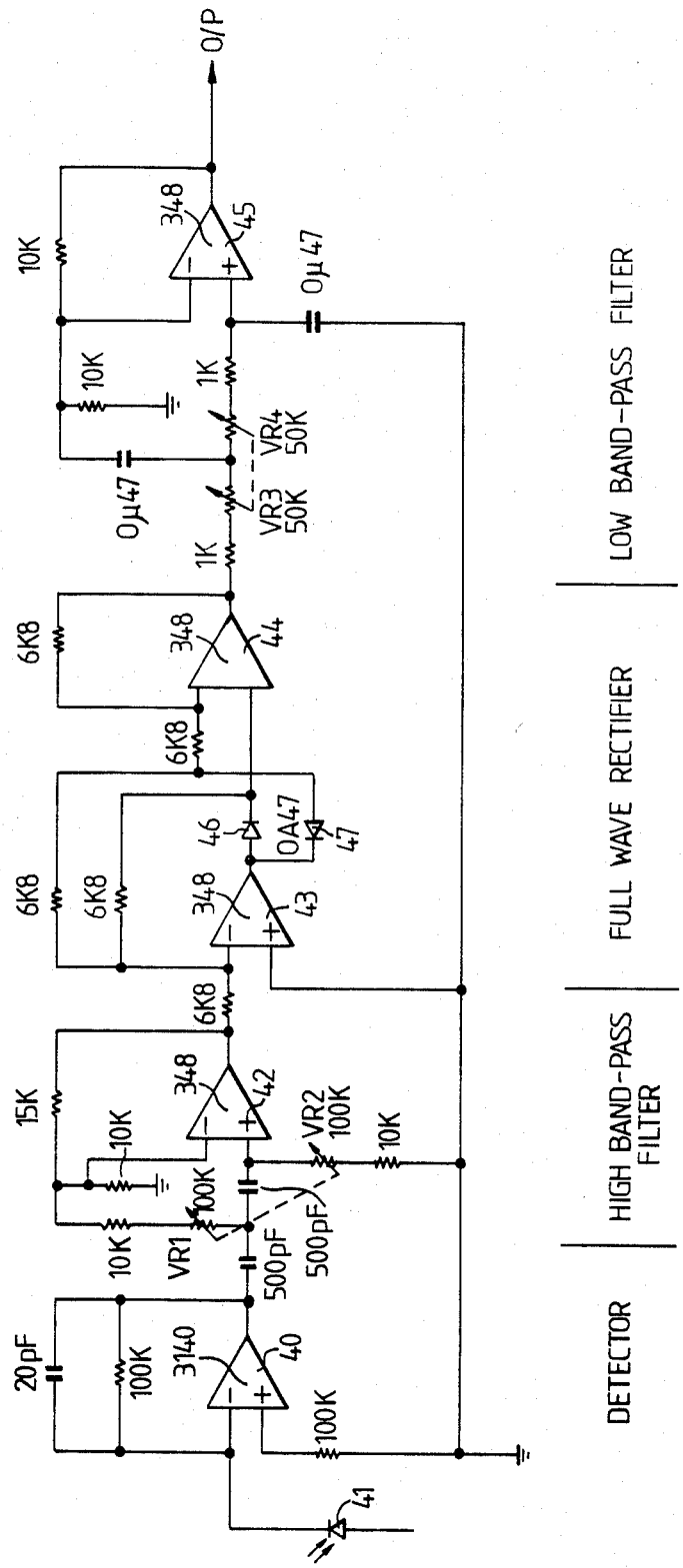
FIG. 4 shows a simple specific circuit arrangement which operates according to the basic flowmeter block diagram of FIG. 3.

FIG. 4 shows a basic circuit arrangement for demodulating the vortex signals. It can be considered as comprising four parts: detector, high band-pass filter, full wave rectifier and low band-pass filter, as indicated. A detector amplifier 40, such as type CA 3140, forms the input stage. The light detector may be comprised by a Motorola MRD 500 PIN diode 41. The other three parts of the circuitry were designed using the quad-operational amplifier type 348, the individual amplifiers of which are indicated by reference numerals 42, 43, 44 and 45. The high band-pass filter stage may be adjustable via VR1 and VR2 from 3 kHz to 30 kHz, for example. Such adjustment may be necessary to take care of possible variation in the optimum center frequency of the high band-pass filter. Most of the noise due to pump vibration and other low frequency (less than 500 Hz) disturbances are effectively eliminated by the high band-pass filter and the flowmeter is thus immune to low frequency vibrations. This is illustrated in FIG. 5 of which the upper trace is the detector output and the lower trace is the low band-pass filter output; the vibration noise being eliminated from the original signal.

Figure 6A:
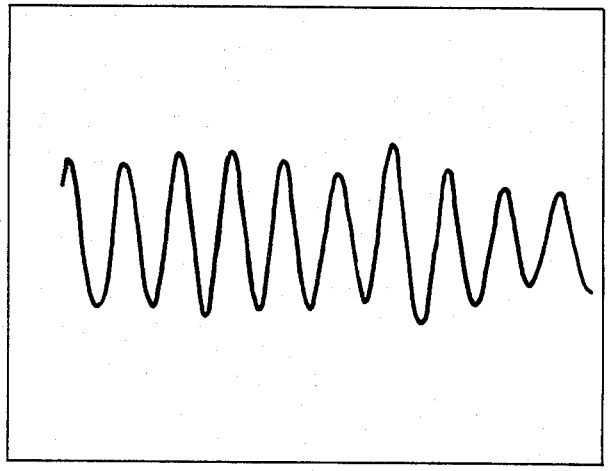
FIGS. 6a and 6b show "cleaned" vortex shedding signals for different flow rates as produced by the filtering etc. of the present invention.
Figure 6B:
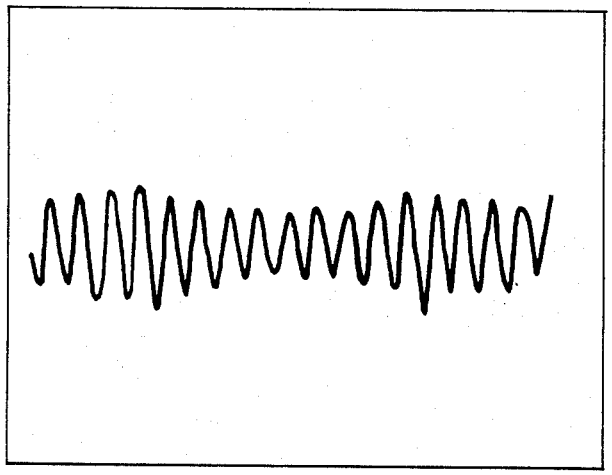

The demodulation is carried out by the full wave rectifier using two amplifiers 43 and 44 and germanium diodes 46, 47. The demodulated output is low band-pass filtered using an adjustable filter including amplifier 45. Since the vortex frequency varies with flow rate it was found desirable to be able to manually adjust the low band-pass filter in this basic arrangement by means of varaible resistors VR3 and VR4. FIGS. 6a and b show the output of the low band-pass filter for different water flows, that of FIG. 6b being twice that of FIG. 6a. The basic circuit of FIG. 4 may be developed in order to allow for automatic adjustment of the high and low band-pass filters. Such a modified circuit is shown schematically in FIG. 7 and a specific example of such an automatic adjustment circuit with a manual option is shown in FIG. 8. A flowmeter incorporating this automatic adjustment circuitry is termed a vortex frequency tracking flowmeter.

Figure 7:
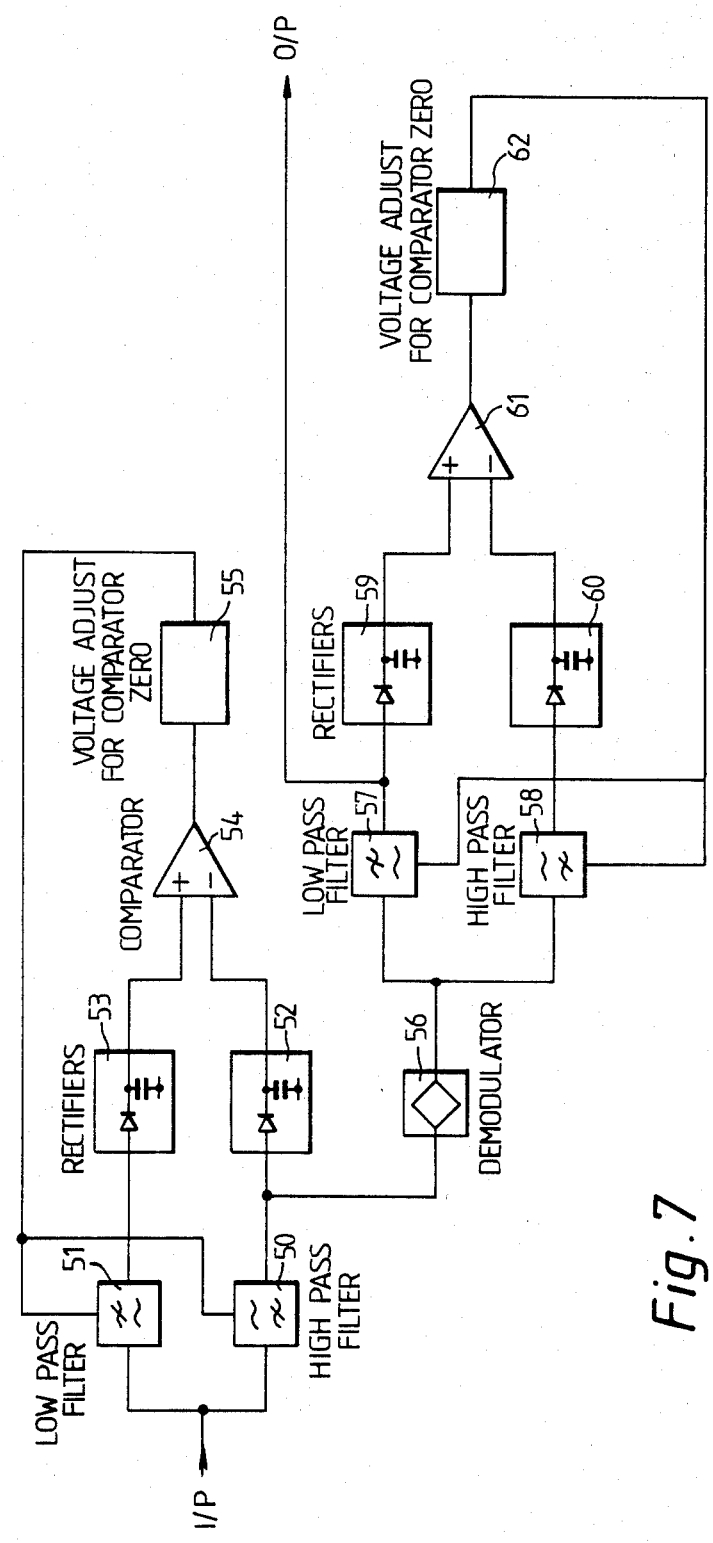
FIG. 7 shows schematically the circuitry of an improved performance flowmeter with automatic filter adjustment.
Figure 8:
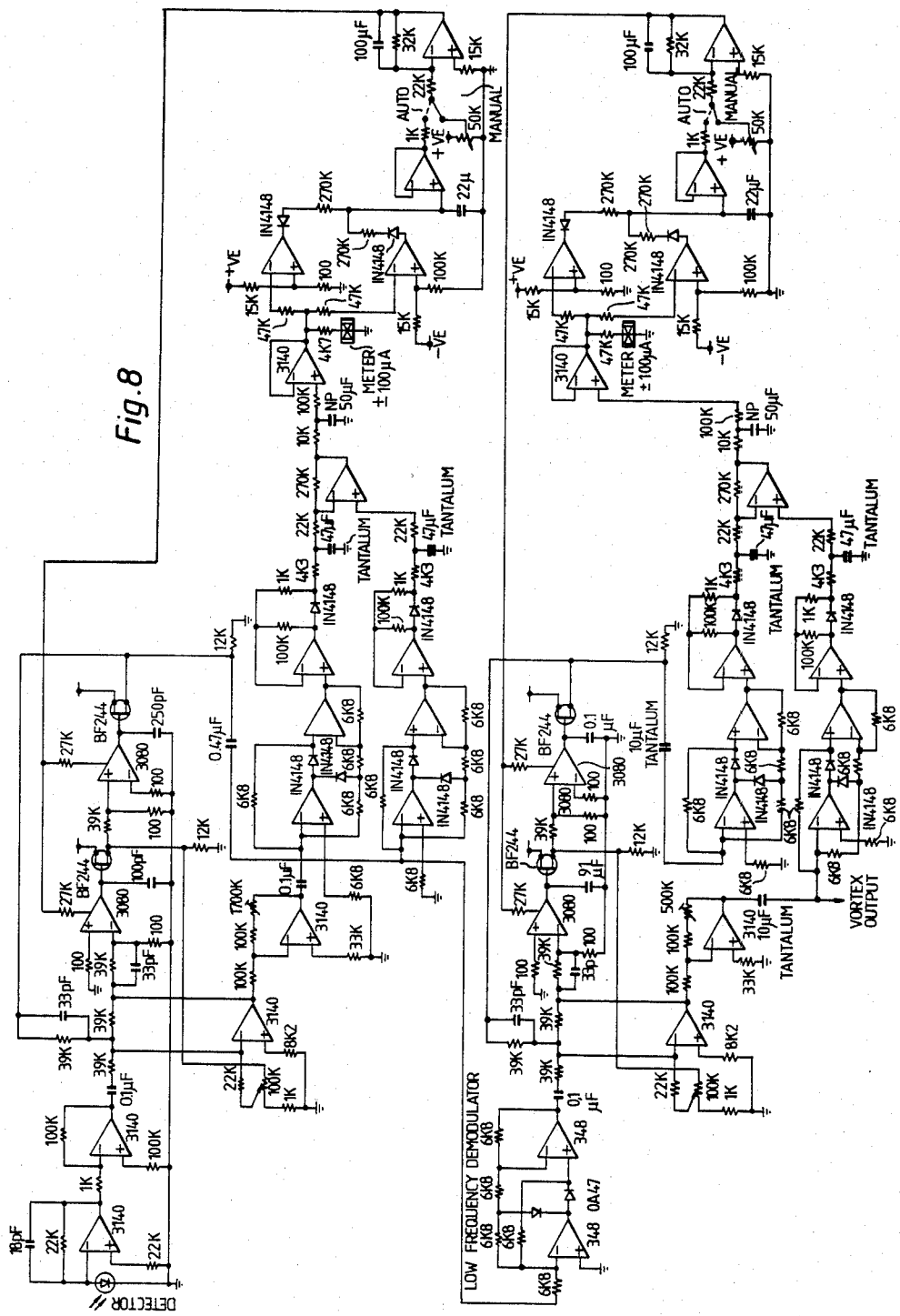
FIG. 8 shows the circuitry of a specific flowmeter with automatic filter adjustment which is based on the schematic circuit of FIG. 7.

The schematic circuit arrangement shown in FIG. 7 employs two voltage controlled filters, each with low pass and high pass outputs, to automatically place the filters in the optimum position. The input voltage is applied to voltage dependent filter comprising high pass and low pass filters 50 and 51, respectively. This particulate filter puts the 3 dB, for example, point of both signal halves at the same frequency. The outputs of filters 50 and 51 are rectified and filtered at 52 and 53, respectively, to give d.c. voltages dependent on the amount of energy at the two outputs. These d.c. voltages are compared at comparator 54 and a voltage generated at 55 which is applied to control the filters 50 and 51 whereby to force the comparator output to zero. The generated voltage closes the loop by being the control of the filters 50 and 51.

The output from the high pass filter 50 is full-wave rectified by demodulator 56, whose output is applied to a voltage dependent filter similar to that described above and comprising low pass filter 57, high pass filter 58, rectifiers 59 and 60, comparator 61 and a voltage generator 62 serving to adjust filters 57 and 58 for comparator zero. The output O/P from the low pass filter 57 comprises a good quality sine wave ready for counting and thus providing the vortex frequency.

FIG. 8 shows a specific circuit arrangement based on the schematic circuit of FIG. 7, and including a manual adjustment option for each of the filters in order to obtain comparator zero.

The output of the circuit of FIG. 7 or of FIG. 8 thus comprises a vortex shedding signal cleaned of pump vibration noise and other low frequency and whose frequency can be used to determine the flowrate. The flow velocity is proportional to the frequency of production of the vortices, the vortex shedding signal, and thus the output of the circuit of FIG. 7 or of FIG. 8 may be applied to a counter (not shown) which, when suitably calibrated, will directly display the fluid flow rate.

What is claimed is:

1. A method of monitoring the vortex shedding frequency from which a fluid flow rate or a parameter dependent thereon may be calculated, the method comprising: modulating an optical beam in dependence on the alternate high and low velocity regions comprising the vortex street, detecting the modulated beam, filtering the detector output by means of a first band-pass filter having a center frequency $f_c$, adjusting the pass-band of said filter in accordance with variations in the optimum value of frequency $f_c$, the first filter output comprising an amplitude modulated signal of frequency $f_c$ modulated by the vortex shedding frequency, demodulating the first filter output and filtering the demodulated output by means of a second band-pass filter, the frequency of the second filter output comprising the vortex shedding frequency.

2. The method of claim 1 including the steps of amplifying the second filter output and displaying it on an oscilliscope or another output display arrangement.

3. The method of claim 1 including the step of adjusting the pass-band of the second filter in accordance with variations in the vortex shedding frequency.

4. An apparatus for monitoring a vortex shedding frequency from which a fluid flow rate or a parameter dependent thereon may be calculated, comprising: means for generating an optical beam, means for modulating the optical beam in dependence on the alternate high and low velocity regions comprising the vortex street, means for detecting the modulated beam, a first band-pass filter having a center frequency $f_c$ for filtering the output of the detecting means, said filter including means for adjusting the pass-band thereof in accordance with variations in the optimum value of frequency $f_c$, the output of the first filter comprising a signal of frequency $f_c$ modulated by the vortex shedding frequency, means for demodulating the first filter output, and a second band-pass filter for filtering the output of the demodulating means, the frequency of the second filter output comprising the vortex shedding frequency.

5. The apparatus of claim 4 in which the second filter includes means for adjusting the pass-band thereof in accordance with variations in the vortex shedding frequency.

6. The apparatus of claim 4 in which the generating means comprises a laser.

7. The apparatus of claim 4 in which the detecting means comprises a silicon PIN photodiode.

8. The apparatus of claim 6 in which the detecting means comprises a silicon PIN photodiode.

* * * * *